(12) United States Patent
Buell et al.

(10) Patent No.: US 6,597,123 B1
(45) Date of Patent: Jul. 22, 2003

(54) INVERTER FOR DRIVING EL LAMP AND LIQUID CRYSTAL DISPLAY

(75) Inventors: Brian Jeffrey Buell, Gilbert, AZ (US); Robert Allen Kimball, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 10/340,809

(22) Filed: Jan. 13, 2003

Related U.S. Application Data

(62) Division of application No. 09/790,007, filed on Feb. 20, 2001.

(51) Int. Cl.⁷ .................................................. G09G 3/10
(52) U.S. Cl. ...................................... 315/169.3; 345/45
(58) Field of Search .......................... 315/169.3, 169.4; 345/45, 102

(56) References Cited

U.S. PATENT DOCUMENTS

| | | | |
|---|---|---|---|
| 4,527,096 A | 7/1985 | Kindlemann | 315/169.3 |
| 4,529,322 A | 7/1985 | Ueda | 368/255 |
| 4,982,141 A | 1/1991 | Pace et al. | 315/169.3 |
| 5,313,141 A | 5/1994 | Kimball | 315/169.3 |
| 5,323,305 A | 6/1994 | Ikeda et al. | 363/98 |
| 5,966,106 A | * 10/1999 | Yamazaki | 345/45 |

FOREIGN PATENT DOCUMENTS

WO    WO 98/30070    7/1998

OTHER PUBLICATIONS

Data Sheets for D355A, D361A, and D372A EL Lamp Drivers © 1998–2000 Durel Corporation.

* cited by examiner

*Primary Examiner*—David Vu
(74) *Attorney, Agent, or Firm*—Paul F. Wille

(57) ABSTRACT

An inverter for driving an EL lamp is tapped to provide voltage or current for driving one or more EL lamps and an LCD. In accordance with one aspect of the invention, one side of the pump inductor is tapped for a voltage that drives the LCD.

9 Claims, 3 Drawing Sheets

INVERTER FOR DRIVING EL LAMP AND LIQUID CRYSTAL DISPLAY

CROSS-REFERENCE TO RELATED APPLICATION

This application is a division of Application Ser. No. 09/790,007, filed Feb. 20, 2001, which is assigned to the assignee of this invention. The entire contents of said Application are hereby incorporated by reference.

BACKGROUND OF THE INVENTION

This invention relates to battery operated inverters and, in particular, to an inverter for driving an electroluminescent (EL) panel having one or more EL lamps, one or more light emitting diodes (LEDs), and providing a bias voltage for a liquid crystal display.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of inverters in which the energy stored in an inductor is supplied to an EL lamp as a small current at high voltage as the inductor is discharged either through the lamp or into a storage capacitor. The voltage on a storage capacitor is pumped up by a series of high frequency pulses from the inverter. The direct current produced by inverter must be converted into an alternating current in order to power an EL lamp. U.S. Pat. No. 4,527,096 (Kindlmann) discloses a switching bridge for this purpose. The bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

Many portable electronic devices, such as personal digital assistants and cellular telephones, use LEDs for illuminating a liquid crystal display (LCD) and an EL lamp for illuminating a keypad. The LEDs are typically powered by a driver, the liquid crystal display has its own driver, and the EL lamps are powered by an inverter. A driver is required for the LEDs because portable electronic devices use a 1.5–3 volt battery and LEDs have a minimum forward voltage drop of 1.8 volts. If LEDs are connected in series to minimize current, then the voltage requirement increases accordingly. If the LED is switched by a transistor, then the forward voltage drop of the transistor further increases the required supply voltage. In addition, LEDs require a ballast or current limiting device, such as a resistor or inductor, which dissipates power. Inductors are more efficient than resistors but are relatively expensive components and it is desired to minimize the number of inductors required by a circuit. The liquid crystal display requires bias voltages.

It would provide a significant cost savings if LEDs, LCDs, and EL lamps could be driven from the same driver. The problem is that EL lamps need 100 volts or more AC, LEDs need from 5–12 volts DC, and LCDs typically need a bias of 5–30 volts.

In view of the foregoing, it is therefore an object of the invention to provide an inverter for providing plural voltages for a personal electronic device.

Another object of the invention is to provide an inverter for driving LEDs, LCDs, and EL lamps by adapting an existing, commercially available inverter.

A further object of the invention is to provide an inverter for driving LEDs, LCDs, and EL lamps by modification to either type of existing inverter for EL lamps.

SUMMARY OF THE INVENTION

The foregoing objects are achieved in this invention in which an inverter for producing plural voltages is tapped to provide voltage or current for driving one or more EL lamps, LEDs, and an LCD. One side of a pump inductor is tapped for a voltage that drives one or more EL lamps and the LCD.

BRIEF DESCRIPTION OF THE DRAWINGS

A more complete understanding of the invention can be obtained by considering the following detailed description in conjunction with the accompanying drawings, in which.

DETAILED DESCRIPTION

Figure 1:
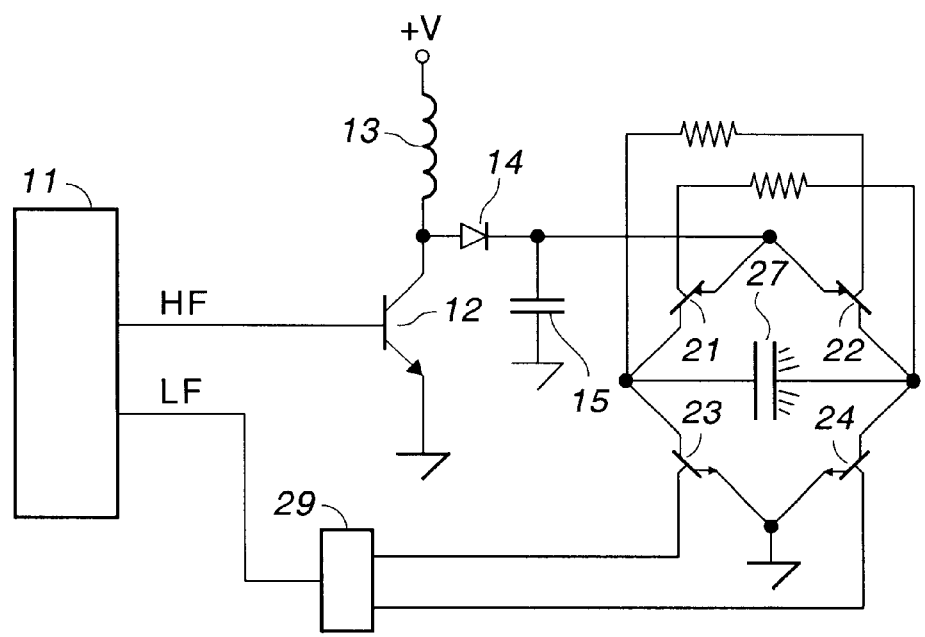
FIG. 1 is a schematic based upon U.S. Pat. No. 4,527,096.

In FIG. 1, pulse generator 11 provides high frequency pulses to transistor 12, which is coupled in series with inductor 13 between supply and common. The pulses are coupled through diode 14 to storage capacitor 15, which is coupled across the DC diagonal of a switching bridge including transistors 21, 22, 23, and 24. Diode 14 prevents storage capacitor 15 from discharging through transistor 12. EL lamp 27 is coupled across the AC diagonal of the switching bridge. Because neither end of EL lamp 27 is continuously grounded, the configuration illustrated in FIG. 1 is sometimes referred to as a floating lamp configuration. A low frequency signal is coupled to transistors 23 and 24 through flip-flop 29, which causes opposite legs of the bridge to conduct alternately, thereby producing an alternating current through lamp 27. The apparatus of FIG. 1 is known in the art, e.g. U.S. Pat. No. 4,527,096 (Kindlmann).

Figure 2:
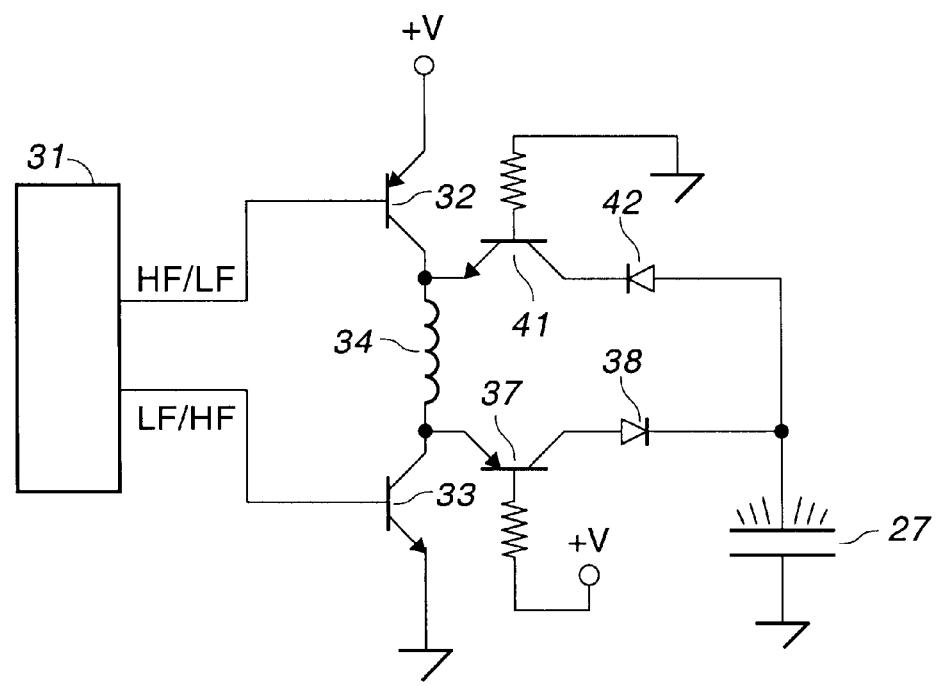
FIG. 2 is a schematic based upon U.S. Pat. No. 5,313,141.

In FIG. 2, pulse generator 31 provides low frequency pulses to one of transistors 32 and 33 and low frequency pulses to the other of the transistors. Inductor 34 is coupled in series between transistors 32 and 33. While transistor 32 is conducting, high frequency pulses coupled to the base of transistor 33 cause inductor 34 to produce a series of high frequency, high voltage, positive pulses that are coupled through transistor 37 and diode 38 to EL lamp 27. After a predetermined period, or after a predetermined number of high frequency pulses, the signals to transistors 32 and 33 are reversed. While transistor 33 is conducting, high frequency pulses coupled to the base of transistor 32 cause inductor 34 to produce a series of high frequency, high voltage, negative pulses that are coupled through transistor 41 and diode 42 to EL lamp 27. The process repeats, producing a low frequency alternating current through. EL lamp 27. The apparatus of FIG. 2 is known in the art, e.g. U.S. Pat. No. 5,313,141 (Kimball). Because neither end of inductor 34 is continuously grounded, the configuration illustrated in FIG. 2 is sometimes referred to as a floating inductor configuration.

Figure 3:
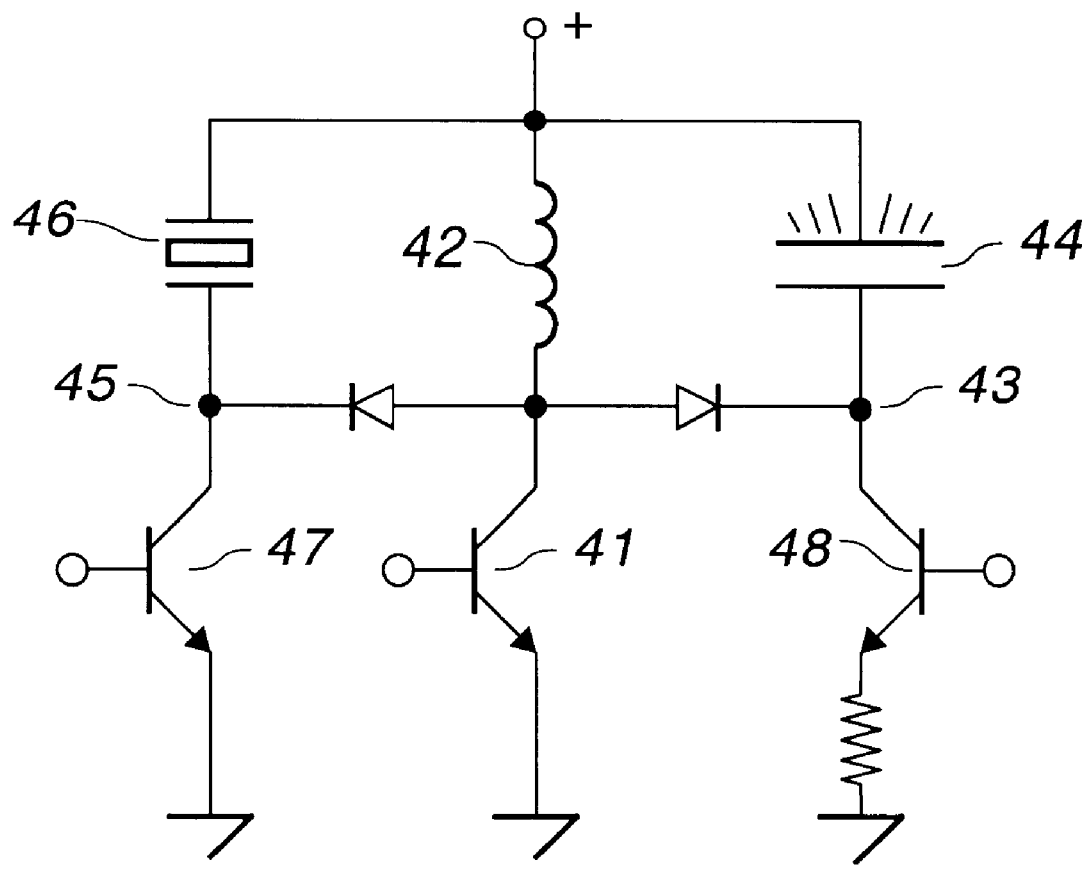
FIG. 3 is a schematic based upon U.S. Pat. No. 4,529,322.

FIG. 3 is the schematic of an inverter for driving two capacitive loads as is disclosed as prior art in U.S. Pat. No. 4,529,322 (Ueda). In this inverter, transistor 41 is switched on and off at about eight kilohertz. When transistor 41 turns on, current flows through inductor 42, storing energy in the magnetic field generated by the inductor. When transistor 41 shuts off, the magnetic field collapses at a rate determined by the turn-off characteristics of the transistor. The voltage across inductor 42 is proportional to the rate at which the field collapses. A large positive voltage is developed at node 43, charging EL lamp 44 above supply voltage, and at node 45, charging piezoelectric buzzer 46 above supply voltage. Transistors 41, 47 and 48 are active in different combinations to operate either buzzer 46 or EL lamp 44.

Figure 4:
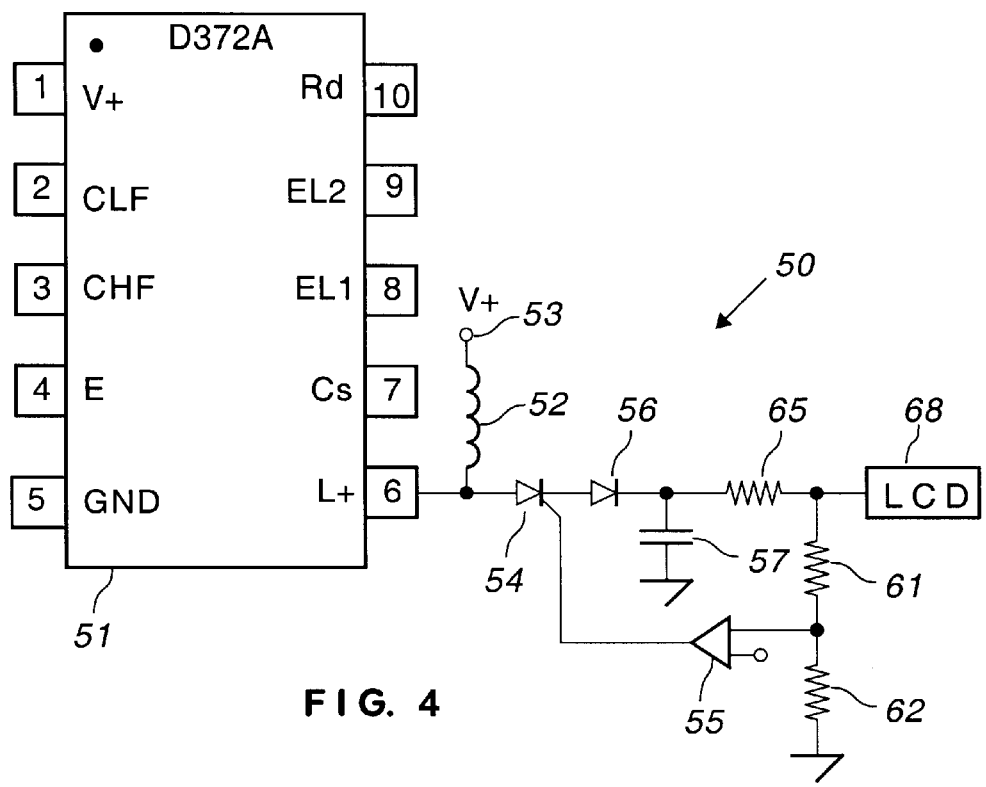
FIG. 4 is a schematic of a preferred embodiment of a bias source for an LCD.

In FIG. 4, a commercially available inverter is modified in accordance with the invention. Inverter 51 is known as a type D372A, available from Durel Corporation, Chandler, Arizona. The inverter includes an inductive boost circuit and an H-bridge output; i.e. an EL lamp (not shown) is coupled across the AC diagonal (pins 8 and 9) of a switching bridge within the inverter. Inductor 52 is part of the inductive boost circuit and has a first end coupled to supply 53 and an output end coupled to pin 6 of inverter 51.

Bias source 50 includes a voltage tap and a voltage regulator to reduce ripple. The anode of SCR 54 is coupled to the output end of inductor 52, the gate of the SCR is coupled to comparator 55, and the cathode of the SCR is coupled through diode 56 to capacitor 57. When SCR 54 conducts, pulses from inductor 52 (caused by circuitry in integrated circuit 51) charge capacitor 57. The voltage on capacitor 57 is sampled by a voltage divider including series resistors 61 and 62 and the tap voltage is coupled to one input of comparator 55. The voltage divider, comparator, and SCR provide a simple regulator for controlling the bias voltage applied to liquid crystal display 68. Capacitor 57 and resistor 65 are a low frequency filter.

Figure 5:
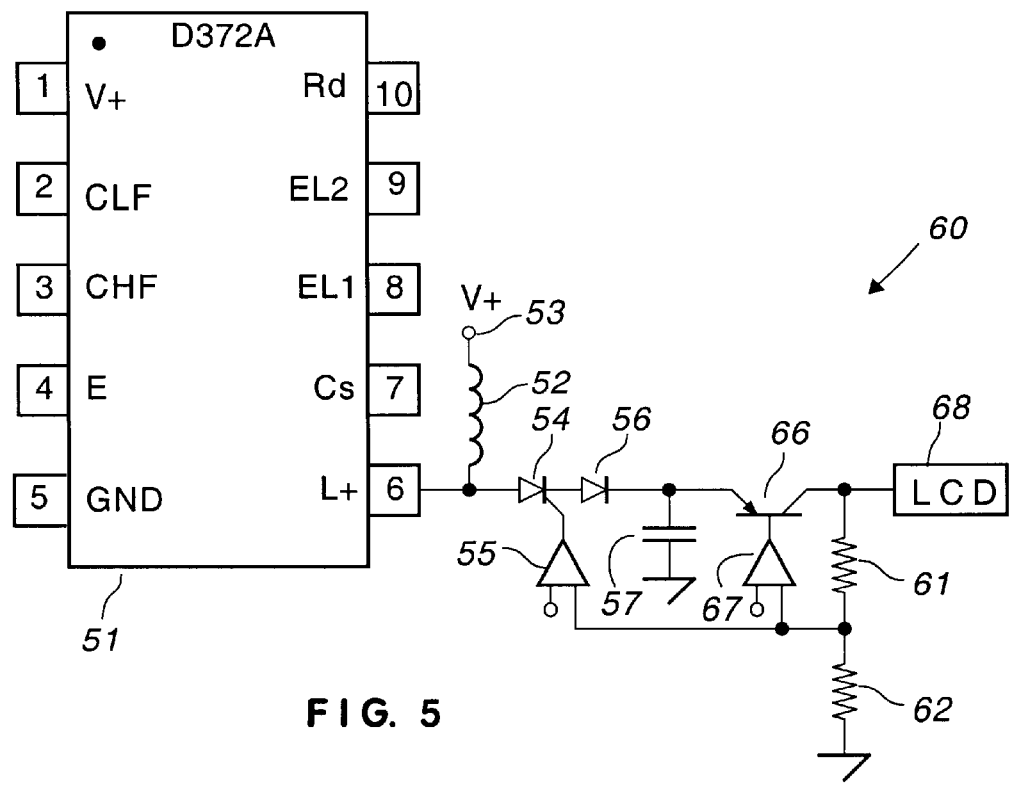
FIG. 5 is a schematic of an alternative embodiment of a bias source for an LCD.

FIG. 5 is a schematic of a preferred embodiment of the invention in which a series pass transistor couples the inductor to a liquid crystal display. In bias source 60, elements common to source 50 have the same reference number. Transistor 66 is controlled by comparator 67, which has one input coupled to the junction of resistors 61 and 61 and the other input coupled to a reference voltage. The reference signals coupled to comparators 55 and 67 need not have the same voltage. Transistor 66 provides additional smoothing of the bias signal to liquid crystal display 68.

The invention thus provides an inverter for driving LCDs and EL lamps by adapting an existing, commercially available inverter. The inverter can have either an H-bridge (floating EL lamp) output or a non-floating (one end grounded) output for an EL lamp.

Having thus described the invention, it will be apparent to those of skill in the art that various modifications can be made within the scope of the invention. For example, only a single bias source is illustrated but it is understood that two bias sources would be used to provide positive bias and negative bias or high bias and low bias, depending upon whether or not a split power supply was used for the liquid crystal display.

The invention claimed is:

1. In an inverter including an integrated circuit having a plurality of pins and an external inductor coupled to at least one of said pins, said inverter producing a first voltage suitable for driving at least one EL lamp, the improvement comprising:
    a bias source coupled to said inductor, said bias source producing a second and voltage suitable for driving the LCD, wherein said second voltage is derived from the first voltage.

2. The inverter as set forth in claim 1 wherein said bias source includes a voltage tap coupled to said inductor and a voltage regulator coupled to said tap.

3. The inverter as set forth in claim 2 wherein said bias source includes a pass transistor coupling said inductor to said voltage tap.

4. The inverter as set forth in claim 2 wherein said voltage regulator includes an SCR coupling said inductor to said voltage tap.

5. The inverter as set forth in claim 1 wherein said bias source includes a low pass filter.

6. An inverter for simultaneously driving at least one EL lamp and an LCD, said inverter comprising:
    an inductor for producing a high voltage suitable for driving said EL lamp; and
    a bias source coupled to said inductor for providing a bias voltage suitable for the LCD, wherein said bias voltage is derived from said high voltage.

7. The inverter as set forth in claim 6 wherein said bias source includes a low pass filter.

8. The inverter as set forth in claim 7 wherein said bias source includes an SCR coupling said inductor to said low pass filter.

9. The inverter as set forth in claim 8 wherein said low pass filter includes a shunt capacitor and a series pass transistor.

* * * * *